United States Patent [19]

Wisotsky, Sr.

[11] Patent Number: 4,877,353
[45] Date of Patent: Oct. 31, 1989

[54] WASTE PILE

[76] Inventor: Serge Wisotsky, Sr., 89 Bullard St., Sharon, Mass. 02067-0422

[21] Appl. No.: 884,935

[22] Filed: Jul. 14, 1986

[51] Int. Cl.⁴ .............................................. B09B 1/00
[52] U.S. Cl. .................................. 405/128; 252/633; 252/626; 405/52; 405/129
[58] Field of Search ................. 405/128, 129, 228, 52, 405/210; 252/633, 626, 628

[56] References Cited

U.S. PATENT DOCUMENTS

| | | | |
|---|---|---|---|
| 365,816 | 7/1887 | Hutchinson | 405/257 X |
| 3,022,634 | 2/1962 | Kinneman et al. | 405/228 |
| 3,675,428 | 7/1972 | Watts | 405/129 |
| 3,800,548 | 4/1974 | Wisotsky | 405/228 |
| 4,040,480 | 8/1977 | Richards | 405/128 X |
| 4,178,109 | 12/1979 | Krutenat | 405/128 |
| 4,321,158 | 3/1982 | Beall et al. | 405/128 X |
| 4,372,707 | 2/1983 | Ostgaard | 405/232 X |
| 4,428,700 | 1/1984 | Lennemann | 405/128 |

FOREIGN PATENT DOCUMENTS

| | | | |
|---|---|---|---|
| 3248592 | 7/1984 | Fed. Rep. of Germany | 405/128 |
| 0023872 | 2/1977 | Japan | 405/128 |
| 2034509 | 6/1980 | United Kingdom | 405/128 |

Primary Examiner—Dennis L. Taylor

[57] ABSTRACT

Apparatus and method for embedding hazardous waste material deeply within stable geological formations. The hazardous material is placed in containers and the containers are placed inside hollow piles. The piles are moved to an offshore location and driven into the seabed.

52 Claims, 8 Drawing Sheets

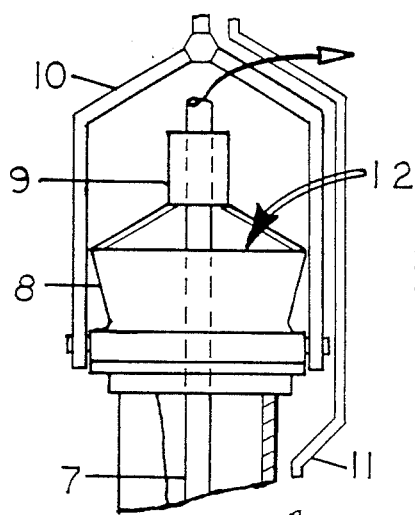
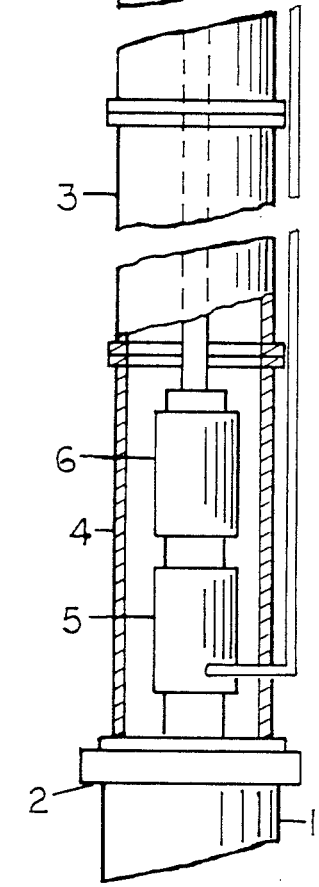
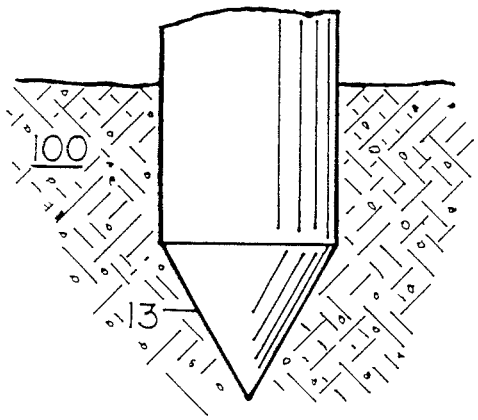
FIG. 1
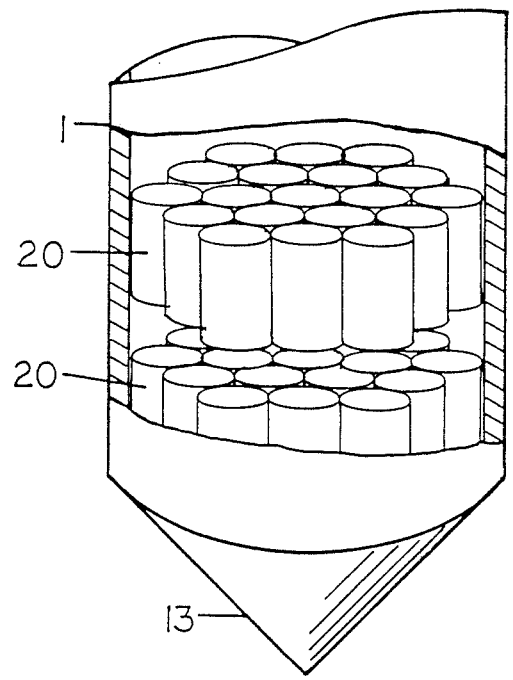
FIG. 2

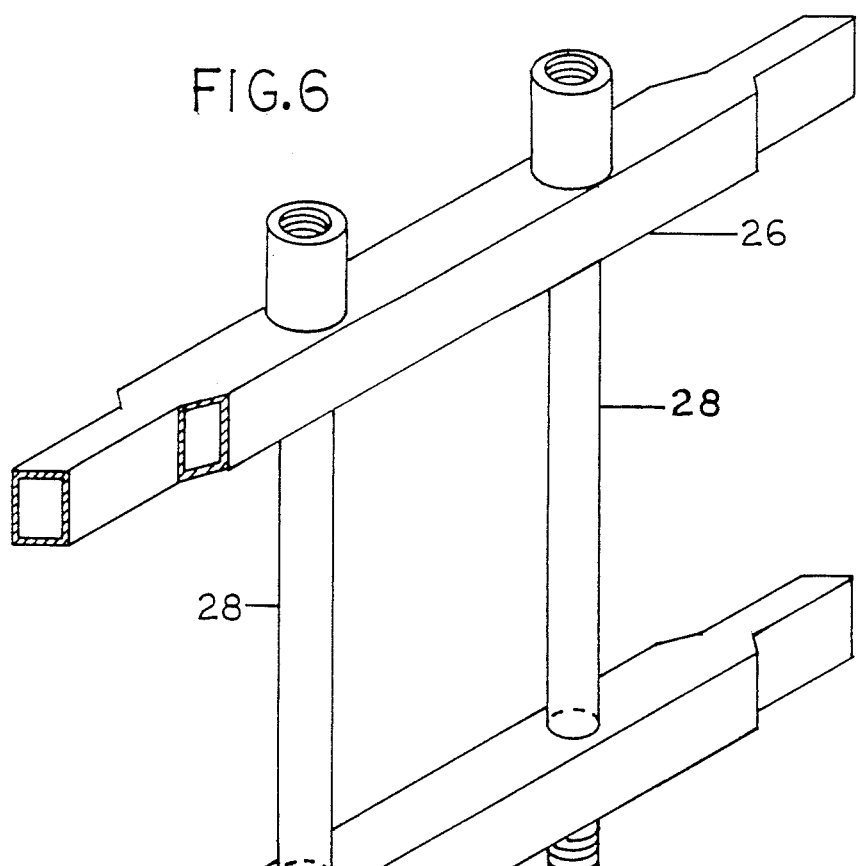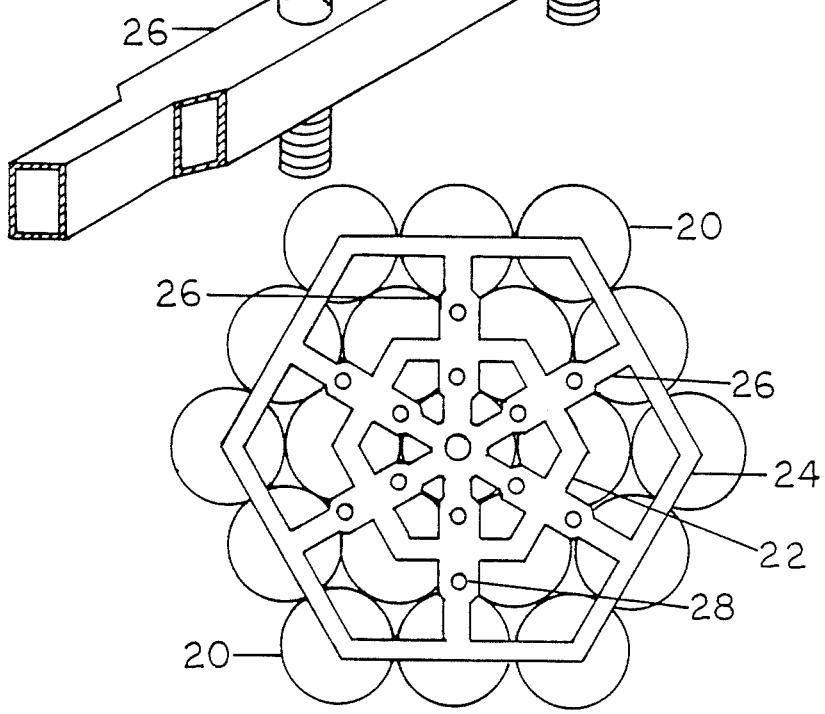

WASTE PILE

FIELD OF THE INVENTION

This invention relates to methods and apparatus for the disposal of hazardous waste, and more particularly to methods and apparatus for the long-term disposal of waste materials which are hazardous to the environment and/or human health.

BACKGROUND OF THE INVENTION

Wastes may be hazardous because of their chemical properties, their nuclear properties, or both. When the hazardous nature possible to convert the chemicals into innocuous substances by, for example, burning or reacting with other chemicals. However, many hazardous chemicals are substantially inert to other chemicals, and serious ojections have been raised to burning wastes, even when the burning is to be carried out at sea.

Radioactive wastes present a more difficult problem than do chemical wastes. An element's radioactivity is reduced only by the passage of time, and many radioactive elements have half-lives long enough to require their isolation for many human generations. Radioactive wastes have been characterized as high-level wastes (HLW), as for example depleted nuclear reactor fuels, and low-level-wastes (LLW), as for example, contaminated laboratory trash, and defueled nuclear submarines.

High level wastes, as defined by the International Atomic Energy Agency (IAEA), are those wastes which contain at least one Curie ($3.7 \times 10^{10}$ disintegrations per second) per metric ton of alpha emitters, or 100 Curies per metric ton of beta and/or gamma emitters. If the radioactive material is tritium the activity must be at least $10^6$ Curies per ton for the material to be considered HLW.

Low level wastes are any radioactive wastes which are not HLW, transuranic waste, mill tailings or any other material which may require shielding during transport or handling.

In view of the long term hazards of radioactive wastes, it has been a goal to isolate them as permanently as possible. Proposals have even been made to remove them permanently by sending them into space by rockets. However, the possibility of an atmosphere-polluting accident when rocketing these poisons into the sun or beyond our solar system mandates an earth-bound repository. However, the criteria for a permanent disposal site are severe. It must: be below any possible ground water level; be isolated from any form of plant, terrestrial, or aquatic life; be fixed in a place of minimum geo-dynamic activity, as for example volcanoes or earthquakes; have a minimum possibility of dispersion, advection, unauthorized disturbance by humans, or activities such as mining and wars, etc.; be susceptible to retrieval of the waste after a few decades, if necessary; and be suitable for monitoring as required.

The problem of disposing of radioactive wastes is accentuated by the large quantities of wastes which have been and are being produced. In 1982 the U.S.A. had about 312,000 m³ of HLW, over 99% of which were from the military and the rest from civilian sources. About 205,000,000 gallons of HLW byproduct from U.S. production of plutonium for the military was stored in tanks at Idaho Falls, Id.; Savannah River, Aiken, South Carolina; and Hanford Reservation, Richland, Washington in 1974, at which time it was understood that the rate of increase of stored material was 7,500,000 gallons per year. The thirty metric tons of spent fuel rods produced each year by a typical reactor have typically been stored "temporarily" near the commercial electric generating plants which used them.

In general, the heat-generation capabilities of HLW range from about 7.7–200 watts/m³ and average about 13.4 watts/m³. The afore-mentioned 312,000 m³ (approximately equal to 1,500,000 fifty-five gallon drums) generates over 4 Megawatts. The world's accumulation of spent fuel was about 44,500 metric tons of uranium in 1980, of which about 6600 metric tons was accumulated in the U.S.A. In 1985, the corresponding amounts were estimated to be about 82,000 and about 14,000 metric tons. It is estimated that the quantities in 1990 will be 145,000 metric tons worldwide and about 27,000 metric tons for the United States, and for the year 2000 the estimated quantities are 257,000 and 58,000 metric tons respectively.

Between 1946 and 1970 the United States had dumped over 90,000 fifty-five gallon steel drums of concrete-encapsulated LLW in both U.S. oceans at locations ranging from 15 to 220 miles offshore. Also, according to U.S. News and World Report, quoted by Park et al, "Disposal of Radioactive Wastes in the Ocean", Sea Technology, January 1984, pp. 62, 64, the United States at that time had approximately 8000 tons of HLW in temporary underwater storage.

In a special report to the President and the Congress entitled "Nuclear Waste Management and the Use of the Sea" (April 1984), the National Advisory Committee on Oceans and Atmosphere (NACOA) referenced many reports from the Department of Energy (DOE), the Environmental Protection Agency (EPA), the U.S. Nuclear Regulatory Commission (NUREG); the Office of Technical Assessment; The Ford Foundation; the International Atomic Energy Agency (IAEA); the General Accounting Office; congressional sub-committees; the National Academy of Sciences; the Union of Concerned Scientists; foreign government reports; individual technical publications as, for example, Science, and *Health Physics*; and individual authors (under Dewey Decimal System classification system numbers TD898 . . . ), concerning the problem of safeguarding terrestrial, aquatic, and atmospheric life. As these and other publications make clear, because hazardous radioactive waste has a lethal potency ranging from decades to multiples of $10^5$ years depending on the half-life and concentration, it must be kept from contaminating waters, soils, and atmosphere during this period of danger.

Nevertheless, in view of the many formidable technical and political obstacles which apply to other modes of waste disposal, there has been a continuing and active interest in proposals for deep water subseabed storage. Despite this active interest, and the expenditure of many millions of dollars on research, there is a dearth of truly practical and dependable methods for subseabed disposal in deep water environments.

Two categories of proposals for subseabed burial techniques have received considerable attention in the belief that they could be useful for disposal of waste originating in the U.S. They include (a) the use of holes of various diameters which have been drilled to various depths, and (b) the use of free-falling or propelled torpedo-shaped projectiles.

Drilled hole techniques include the introduction of waterdiluted, liquidized HLW into porous geologic formations in a manner similar to petroleum recovery, using similar technology. Also, it has been proposed to deposit small containers of encapsulated waste into pre-drilled bore-holes or "wells".

Injection of fluid waste into porous strata under the very deep waters (e.g. 5000 feet or more) which are of particular interest for subseabed burial would involve highly complex technology as well as major hazards in the transfer of the waste from a surface vessel to the deep-water bore-hole. Introduction of containerized waste into bore holes especially in the sands or viscoelastic muds which are often found under these deep waters could be frustrated by cave-ins and has not therefore achieved wide-spread acceptance.

The above-mentioned projectiles are used in self-burial methods and necessarily have a very limited capacity in order to be able to penetrate a desired minimum distance of about 30 meters into the seabed. This projectile method involves depth-of-burial measuring instrumentation with wireless transmission of this data back to the surface. Recovery of projectiles for monitoring or correction of insufficient penetration is difficult in view of the wide area in which they would be dispersed, e.g., about 100 meters apart.

A projectile method tested by Sandia National Laboratories employed a free-falling or propelled container (hydrodynamically streamlined) of cigar or torpedo shape about 1 foot in diameter and 16 feet long with a total storage volume of about two barrels or less. The burial force-time characteristic is an impulse generated by the change in momentum of the projectile, and the burial depth is dependent upon its kinetic energy and the soil resistance since no extra driving energy is applied after this projectile touches or reaches the bottom.

Given the problems of control over position and depth of burial and limited capacity for handling large volumes of waste which apply to the projectile method, the potential for cave-ins in the container-in-bore-hole method and the hazards and complexity which would be involved if liquid injection techniques were applied in deep water environments, the efforts expended on them show that development of a truly suitable method is currently beyond the level of ordinary skill in the art. In this connection, a widely recognized and respected researcher of ocean burial methods for waste has predicted that the technology to bury wastes in the ocean floor will not be ready until the first part of the 21st century; G. R. Heath, *Sea Technology*, Compass Publications, Arlington, Va., October 1984, pp. 71–72.

SUMMARY OF THE INVENTION

It is accordingly one object of this invention to provide apparatus and a method for long-term disposal of hazardous waste materials.

It is another object of the invention to provide apparatus and a method for embedding hazardous waste materials deeply within substantially stable geological formations.

It is another object of the invention to provide apparatus and a method for embedding large quantities of hazardous waste materials within substantially stable geological formations which are underwater.

It is another object of the invention to provide apparatus and a method for embedding hazardous waste materials within stable geological formations under deep sea beds.

These objects have been satisfied by a method of disposing of hazardous material comprising applying sustained driving force from an extrinsic power source to a hollow pile having hazardous waste immobilized within the pile and driving the pile into a burial site beneath the surface of a bed of soil in a stable underwater environment. According to a preferred embodiment, the application of sustained driving force includes repetitively transforming the momentum of a moving mass or masses of solid and/or liquid material into driving impulses by impacting the mass(es) directly or indirectly against the pile, thereby decelerating the mass(es) and utilizing the kinetic energy of the mass(es) to drive the pile. In a particularly preferred embodiment, the application of sustained driving force includes repetitively transforming the momentum of a moving mass or masses of liquid material into driving impulses by impacting the mass(es) directly or indirectly against the pile, thereby decelerating the mass(es) while generating liquid hammer driving pulses, and utilizing the kinetic energy of the mass(es) to drive the pile. However, it is also contemplated that the application of sustained driving force may include jacking the pile into the soil or forcing it into place under the influence of a dead weight, with or without such auxilliary measures as jetting, vibrating, pre-drilling and the like.

The invention also includes certain methods which may be performed in preparation for disposing of hazardous material by the above methods or others. Such preparative methods comprise immobilizing hazardous waste, at a filling location, within an elongated pile or a section of a pile suitable for being driven into the soil of a stable underwater environment by sustained application of driving force from an extrinsic power source, and transporting the filled pile or section thereof in or on a body of water away from the filling location and toward an underwater burial site for said pile.

Also included in the invention is the preparation of various articles of manufacture or apparatus useful for disposal of hazardous waste. Such apparatus may comprise hazardous waste immobilized within an elongated pile or section of a pile suitable for being driven into the soil of a stable underwater environment by sustained application of driving force from an extrinsic power source.

BRIEF DESCRIPTION OF THE DRAWINGS

FIG. 1 depicts a representative pile, which is partially embedded in a sea bed, together with a pile driver.

FIG. 2 shows the lower portion of a pile cut away to show containers therein.

FIGS. 5 and 6 show a structure for securing together a plurality of containers within a layer in a pile and for securing together two or more layers within a pile.

VARIOUS AND PREFERRED EMBODIMENTS

Figure 3:
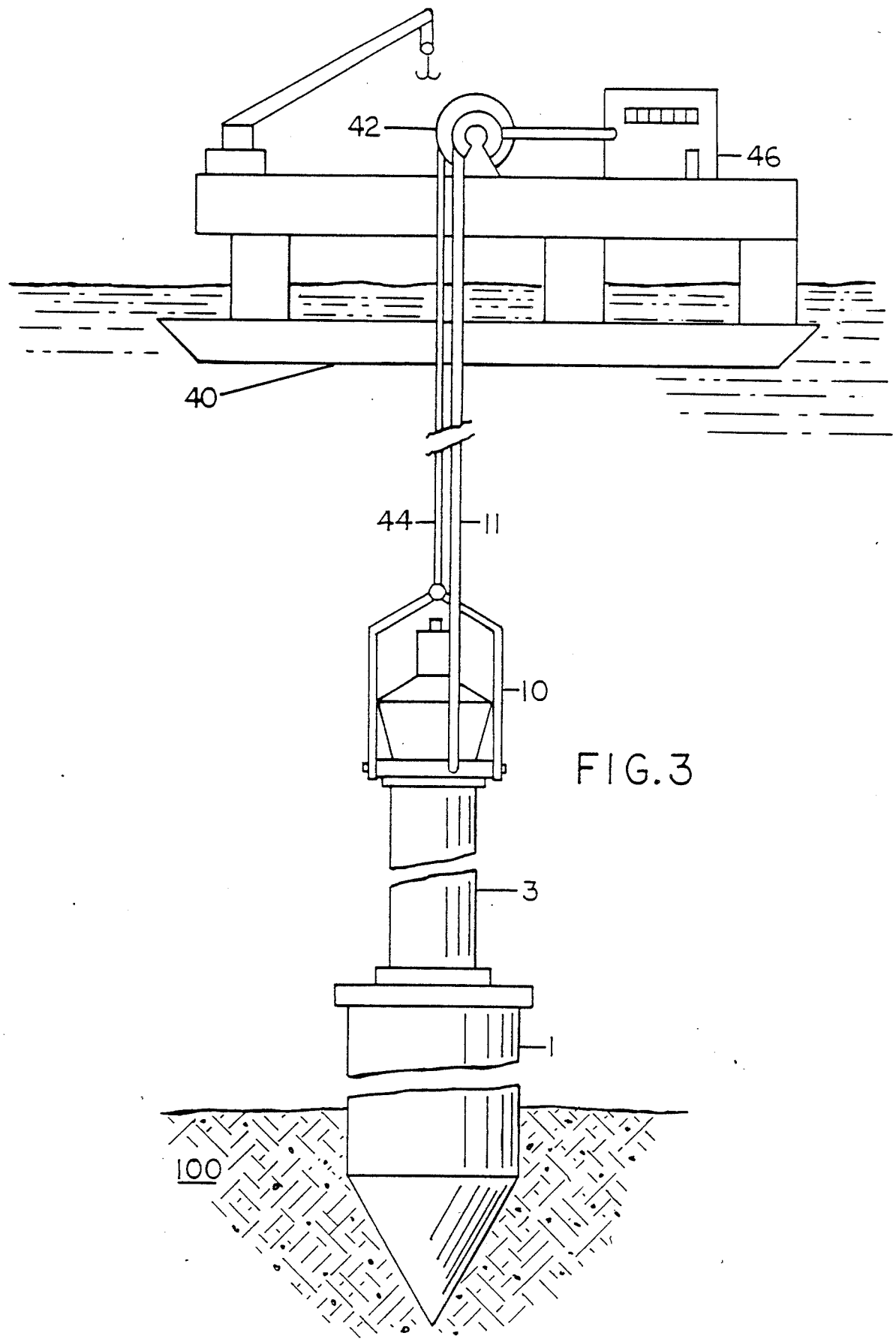
FIG. 3 shows a vessel, cable, driver and pile at a burial site.

The method of the present invention includes a step of sustained application of a driving force, which may be either quasi-static or dynamic, from an external power source to a pile holding containers of waste.

The technique referred to as "quasi-static" involves forcing the pile into subsoil by a dead weight, or by a jacking action. The jacking may be performed, for example, by means of a screw jack, piston jack or rack-and-pinion jack. The jacking techniques usually involve anchoring the jack to the sea bed, and this may be accomplished by a variety of means. Ambient hydraulic pressure may be used to retain the jack in place by evacuating an area under the base of the jack. Mechanical means such as screws or expandable anchors may be placed within the sea bed and attached to the jack to hold it down. A simple expedient is to use weights which bear down on the jack. All these quasi-static techniques may be assisted by vibrating the pile and/or by jetting away material which tends to impede the downward movement of the pile. It is also within the scope of the invention to form at least a portion of the hole by drilling and then insert the lower end of the pile into the hole thus formed.

The dynamic technique involves repetitively transforming the momentum of a moving mass or masses of solid and/or liquid material into driving impulses by impacting the mass(es) directly or indirectly against the pile, thereby decelerating the mass(es) and utilizing the kinetic energy of the mass(es) to drive the pile, i.e., hammering the pile into the soil.

The pile driving wave equation first published by E. A. L. Smith in Engineering News in the early 1950's (Transactions, ASME, 77, 1955, pp. 963–973; Transactions, ASCE, 127, 1962, pp. 1145–1193), which was later refined by Texas A & M and Case Western Reserve Universities and which was confirmed by G. R. Lang in Paper #3827 at the 1980 Offshore Technology Conference, accurately predicts the driveability of various piles by different hammers over a range of soil resistances and can be used in the design of a specific embodiment of the present waste burial system. The wave equation approximates the distributed mass and elasticity of a pile by assuming that it represents a series of lumped masses between springs with the ground friction distributed as resistances among these masses and separately treating the resistance of the pile point. Further it is assumed that the impact force and momentum of a solid hammer hitting a cushion block anvil protecting the top of the pile compresses the stiff block and accelerates the first lumped mass. The displacememt of this mass is assumed to compress the first intervening spring, which transmits this force to the second mass and so on. This sequence is calculated in milliseconds, or fractions thereof, or multiples thereof, depending on the accuracy desired. The resistance of the soil is analogized to the dragging of a sled through sand. Sequential calculations are made for the series of hypothetical masses and springs. This equation calculates the wormlike wave which travels down a long pile. Also, it can be demonstrated that the safest way to increase driving engergy is to increase the hammer mass.

The hammer for driving a pile may comprise either a solid or liquid mass or masses. Using solid masses, underwater pile driving hammers have achieved up to 2,000,000 ft.-lbs. per blow with hydraulic drives which have operated in water depths of 1000 feet. These have used submersible electric motor driven hydraulic pumps to drive hydraulic-ram-actuated drop weights in an air environment.

For driving piles at great water depths, for example, depths of about 13,000 feet or greater, the water hammer types of pile drivers with impulse and energy ratings more than ten times greater may be more practical. The water hammer technique involves, according to a preferred embodiment, valving the ambient sea water into an evacuated water hammer tube from which the water from the previous blow was pumped out by a submersible electric motor pump.

Referring to the drawings, FIG. 1 shows pile 1 partially driven underwater into the seabed 100. As shown by FIG. 2, pile 1 has a pointed tip 13 to facilitate driving, and barrels 20 of waste are located within the lower part of the pile.

Driving is performed by a top-mounted waterhammer 3. The pile 1 is securely fastened to hammer 3 by coupling means 2 which is the same in principle as the remotely operated anchor mechanism sold by Benthos of North Falmouth, Mass., U.S.A., called a deep sea acoustic release, or may be a more sophisticated mechanical clamping arrangement, such as a coupling similar to a machine tool lathe chuck.

The pile hammer 3 includes hammer tube 4 made of flanged sections of heavy-walled tubing bolted together and contains a shock-mounted electric motor 5-hydraulic pump 6 combination near the bottom. Pump 6 evacuates the water out of the hammer tube 4 through a center-mounted pipe 7 discharging water vertically out its top. The pump 6 axially supports the discharge pipe. On the top-most section of the water hammer tube is mounted a fast-opening water control valve 8 and its electro-mechanically operated actuator 9. When open, valve 8 freely admits water from the surrounding body of water through the valve body and its inlet 12 into hammer tube 4. A wire rope sling 10 supports the entire assembly from the surface and also conveys the power and control harness 11 thereto.

FIG. 3 shows a vessel 40 which services the hammer. Vessel 40 has a winch 42 and cable 44 for lifting and lowering the hammer 3 and pile 1. A wire rope sling 10 is provided for lowering and lifting the hammer onto and off of the pile 1, and also for carrying the power and control cable harness 11. The control room 46 provides the power control supply and pays out and winds up the cable harness which may be incorporated within the lifting cable.

Details concerning methods and apparatus for driving piles by water hammer are set forth in U.S. Pat. No. 3,800,548, issued Apr. 2, 1974 for "Waterhammer Pile Driving With Condensable Vapor Reset; U.S. Pat. No. 3,820,346, issued June 28, 1974 for "Free Piston Water Hammer Pile Driving U.S. Pat. No. 3,824,797, issued July 23, 1974, for "Evacuated Tube Water Hammer Pile Driving"; U.S. Pat. No. 3,842,917, issued Oct. 22, 1974 for "Pumped Evacuated Tube Water Hammer Pile Driver"; U.S. Pat. No. 3,846,991, issued Nov. 12, 1974 for "Pile Driving Method and Apparatus", and U.S. Pat. No. 3,922,869 issued Dec. 2, 1975, for "Pumped Evacuated Tube Water Hammer Pile Driver Method". The disclosures in these patents of apparatus and methods for driving piles in incorporated herein by reference.

The pile which is to be driven is an elongated hollow body having sufficient strength to withstand the forces encountered in driving it into the subsoil. In determining the desired pile length the distance the pile is to be buried is one factor to be considered. The ratio of the length of the pile to the burial distance of the bottom of the pile when buried is generally more than about 0.2, preferably at least about 0.3 and more preferably at least about 0.5. Piles at least about 25 feet long are contemplated. More typically the piles will be at least about 40 feet and preferably about 100 feet or more long. The preferred length will range from about 100 to about 600 feet long, preferably about 200 to about 400 feet long and most preferably about 300 feet long.

The cross-sectional shape of the pile is not critical and may be polygonal, for example, hexagonal, but is preferably cricular in shape. The pile cross-section may be modified as by having the walls corrugated with the grooves running in an axial direction so as to provide additional rigidity and cooling area to the walls.

The walls of the pile must be strong enough to withstand the driving mode which has been selected. If impact driving is used, it may be necessary or desireable that the upper end be resistant to mushrooming and the amount of such resistance needed will depend on the velocity and/or other characteristics of the hammer that is used. The side walls must have a sufficient compressive strength for resisting the longitudinal forces of driving and should be resistant to fracture from axial bending. In considering the strength required, the entire assembly of pile and waste should be taken into consideration since the waste ot only adds mass to the structure but also, depending on the manner of installing the waste in the pile, can advantageously modify pile properties such as resistance to bending. Typical wall thicknesses for large piles having diameters in the range of 8 feet to 14 feet and about 300 feet long range from about 1 inch to about 2 inches, but larger and smaller thicknesses can be used.

The longitudinal elasticity of the pile should be minimized if impact driving is used, in order to avoid wasting the driving energy. The end structure is preferably closed and also pointed or rounded at the bottom end in order to further minimize the driving energy required.

The pile may be formed in a single piece by methods wellknown in the metal working art such as, for example, seamless extrusion, or rolling an elongated flat sheet into the shape of a cylinder and welding the longitudinal edges together. The preferred method of making long piles is to provide a plurality of cylindrical sections in end-to-end relationship and to weld or bolt the sections together. By this method extremely large piles, i.e., piles 500 to 600 feet long, which have been used to secure off-shore platforms also, can be provided for waste disposal purposes. If the sections are to be joined by means other than welding, such as by bolting, the connecting structure must be made sufficiently strong enough to resist the contemplated forces, and gaskets may be provided to ensure the joint is tight. Such gasketing may be important to insure tight end seals on individual pile sections holding encapsulated drums of liquid or gaseous waste when trans-shipped overland.

The inside diameter of the pile may be determined by the size of any containers which are to be disposed within the pile. If containers are used the diameter must be at least as great as that of the container and the diameter is preferably at least equivalent to about three times the diameter of a container and it may be up to about five or more container diameters. In absolute terms the inside diameter is contemplated as being more than about one foot and preferably at least about two feet, more preferably at least about six feet and may be as much as about ten or more feet. It is contemplated that the cross-sectional area of the pile will be more than one square foot, preferably at least about three square feet, and more preferably at least about twenty-five square feet, and may be as great as seventy-five or more square feet. If containers are to be used, the internal cross-sectional area of the pile will typically be selected to commodate the containers and/or any necessary shielding, immobilizing and encapsulating material, as well as the waste, with little unused space. The ratio of pile internal cross-sectional area to the container external cross-sectional area is preferably at least about seven and may be up to about nineteen or more.

The pile generally will be constructed of ordinary steel since the depth of burial substantially eliminates corrosion and safeguards the contents. As a result of the depth of the burial there is no need for shielding radioactive wastes except that which may be necessary for HLW during transporting or handling the pile before burial.

In piles intended to be buried in moderately or extremely deep waters, in order to guard against collapse of the piles, it may be necessary or desirable to provide each pile or pile section with means for equalizing the pressure in the pile or pile section with that olf the hydrostatic head in the surrounding water. For example, a one way valve which opens only in response to greater pressure outside a pile than within and which permits only inward flow may be installed in a small port in the wall of the pile. In the alternative, a strong elastomeric or metallic membrane may be secured with a liquid-tight connection across the entire open area of a large port in the wall of a liquid-filled pile to ballon inwardly or outwardly to equalize inside and outside pressures as the pile is lowered or raised in the body of water. Bellows arrangements may be fitted to ports in the pile walls or ends for the same purpose.

Toxic wastes may be generated in the forms of solids, liquids or gases and this invention contemplates disposing of the wastes in any of these forms; however, it is preferred that the uncontained waste be in the form of a solid, and that liquid or gaseous waste be converted to a solid where feasible. Wastes may be treated prior to disposal by such means as calcining them, vitrifying them, or immobilizing them in a matrix as by incorporating them as a constituent in concrete.

Figure 4:
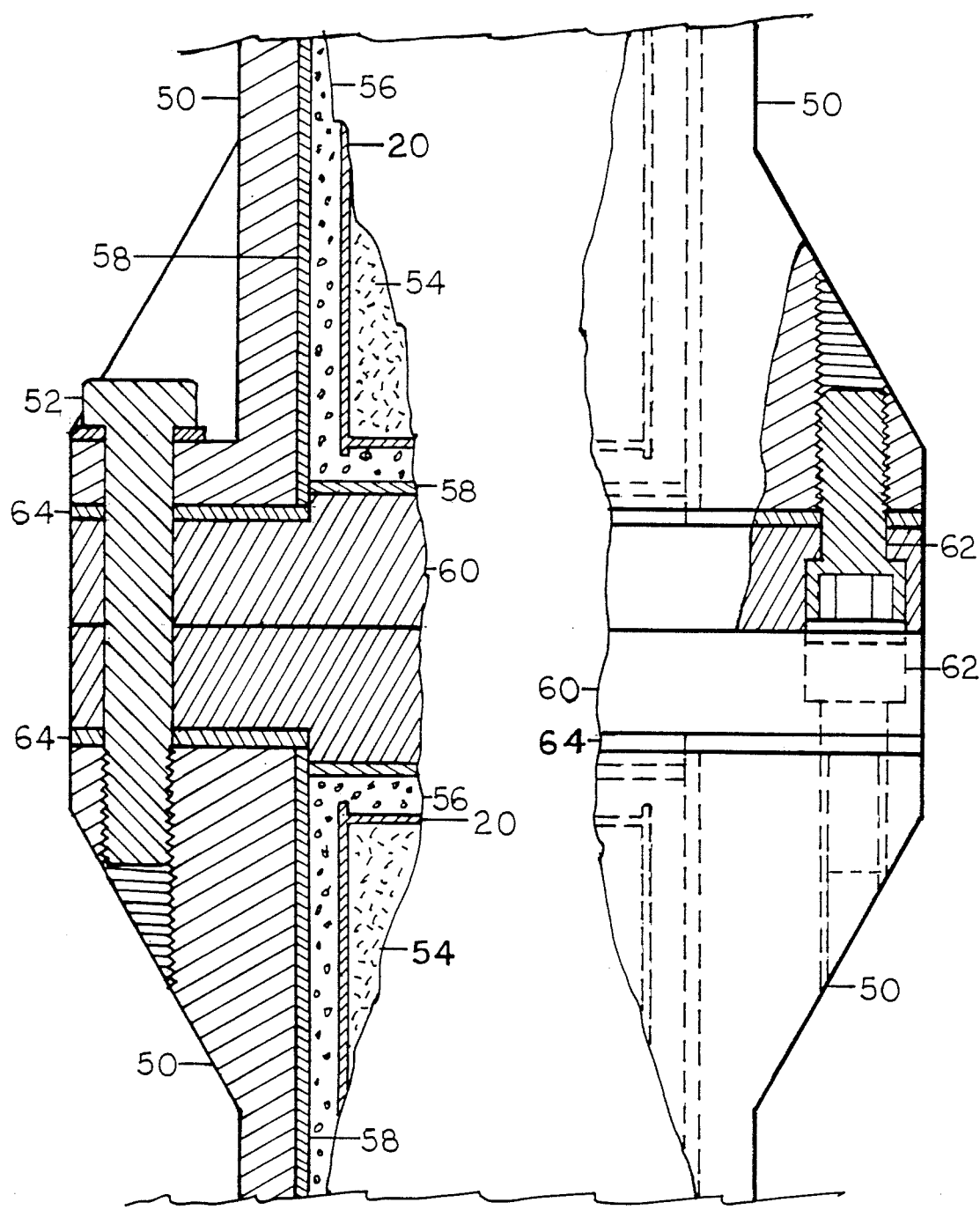
FIG. 4 shows a structure for coupling together two sections of a pile.

While the invention contemplates immobilizing uncontainerized waste either as a single mass in the entire pile or as separate portions held in individual sections of the pile, in the preferred method of carrying out the invention the waste is held within containers which are held in place within the pile. Thus, FIG. 4 shows two 40 foot pile sections 50 bolted together by bolts 52, only one of which is shown. The contents 54 of waste container 20 are solidified and surrounded by a layer of hardened slurry of concrete or resin 56. If contents 54 are HLW, layer 56 is preferably concrete and is further surrounded by a lead, boron, cadmium or lithium radioactivity shield 58 which could be plated or otherwise applied on the interior pile walls in a thickness adequate to control or prevent the escape of radioactive emissions. This shield 58 is enclosed by pile sections 50 on the side and by individual joint metal pile end seals 60 at the ends of pile sections 50. Bolts 52 retain metal seals 60 and gasket 64 in place on the sections to ensure tightness against any gaseous or liquid leakage.

Other wastes, such as chemical waste and LLW, may be placed in containers such as 55 gallon drums. The large diameter, long length pile provides capacity for a large number of such drums which may be stacked six around one per layer or even in layers of twelve surrounding six with one in the center and the stacks may be ten, twenty or more layers high depending on the size of the pile, soil conditions, and the pile hammer capability. A 55 gallon drum/barrel is roughly 23 inches in outside diameter by 35 inches high; consequently a 6 foot diameter by 100 foot long pile can contain $7 \times 33 = 231$ barrels, or over 100 times the capacity of the abovedescribed free-fall projectile in each 100 feet of pile length. The preferred embodiment is a pile about 6 feet in diameter and about 100 feet long containing layers of up to seven barrels per layer.

In the preferred embodiment the containers within a layer are secured together as by welding or clipping them together and the layers of barrels are also secured together as by welding or clipping them together. This is illustrated in FIGS. 5 and 6 show barrels 20 being held together in a layer by bars 22 and 24 which are welded to the ends of the barrel walls and form inner and outer hexagonal retaining members. The bars 22 and 24 are joined by radially extending bars 26, and as shown in FIG. 6 the layers are secured together by bars 28 which extend vertically in spaces between barrels 20 and through bars 26.

This invention also contemplates immobilizing the containers within the pile structure by embedding them in a matrix with a material such as concrete. For example, the concrete could be poured into the spaces between the barrels in the embodiment of FIGS. 5 and 6.

The specific structure of the container may be dictated by the nature of the waste which is to be buried. For example, in burying HLW it may be desirable to have an elongated coaxial tube as a container within the pile, with or without the potential for subsequent retrieval. An example of this is found in FIG. 7, which shows a coaxial pile structure which may be used for storing hot HLW. The coaxial pile structure includes a pile 1 within which is mounted a container 70 which is of substantially smaller outside diameter than the inside diameter of the pile to provide a surrounding space which may for example be filled with mud, shielding material or the like.

Container 70 may extend vertically through any selected portion of the height of pile 1, such as from near the bottom of the pile to an elevation near its top. More preferably, whether or not the top of the pile lies beneath the surface of the sea bed, the top of container 70 should be situated well below such surface, as will be described in greater detail below.

Figure 7:
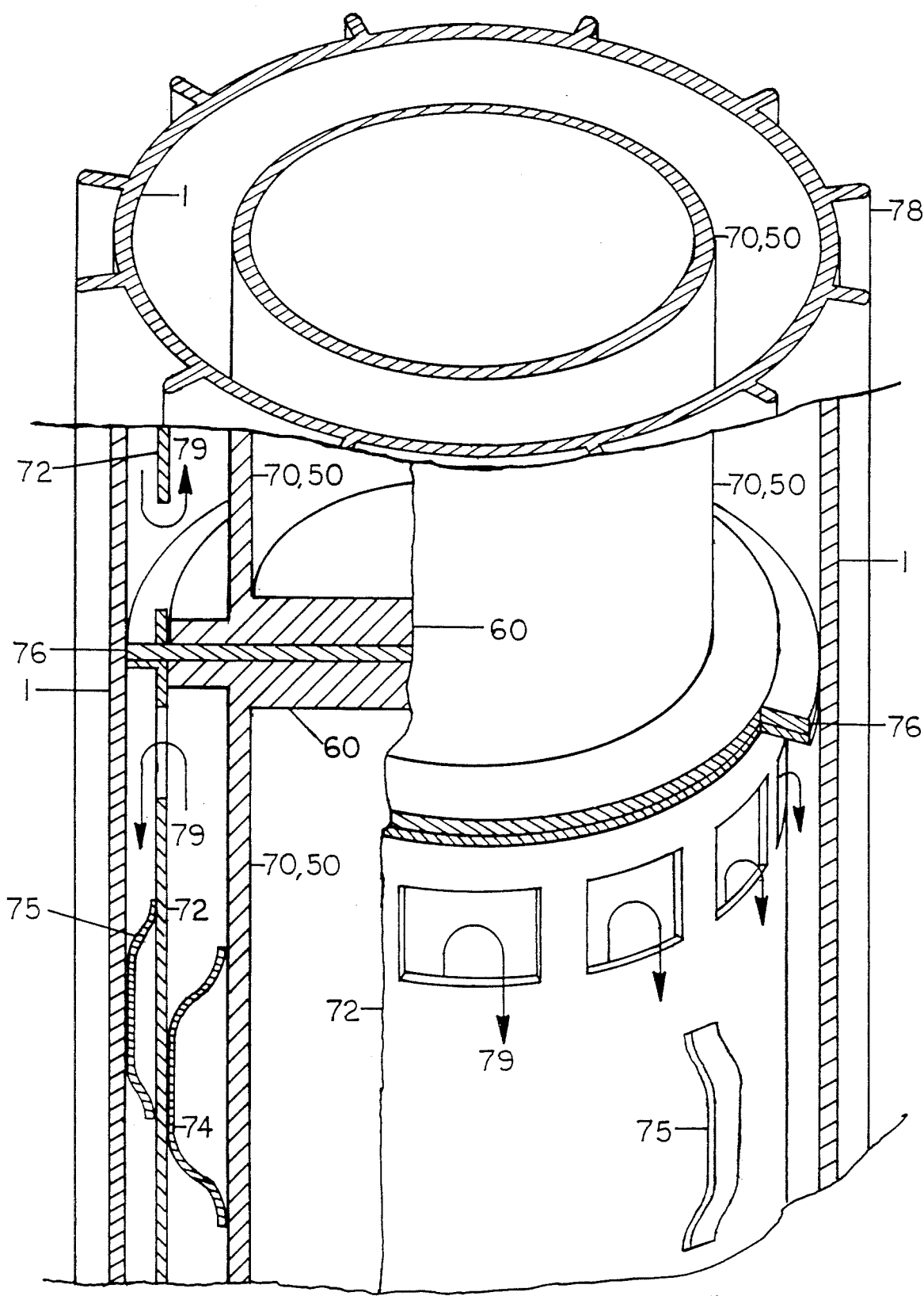
FIG. 7 shows a pile structure for use with HLW.

In order to improve the manner in which heat is transfered by HLW radioactive waste to the outer pile 1 and to the surrounding soil, container 70 is preferably subdivided into a vertical series of separate, vertically spaced containers on a common central axis. A representative container in such series is shown in FIG. 7.

Representative container 70 and each of the remaining waste containers (not shown) in the vertical series is centered within and separated from its own respective cylindrical baffle 72 by centering stays 74. There may be three or more centering stays 74 as necessary on each container 70. Each cylindrical baffle 72 is centered within and separated from the wall of pile 1 by centering stays 75.

Horizontal baffles 76 (only one of which is shown) extend across the entire cross section of the interior of the pile and vertically isolate each container 70 from any containers above and below it and from the top and bottom of the pile. Baffles 76 also close off upward and downward communication between the chambers formed between each of the containers and the respective portions of pile 1 which surround them, thereby thermally isolating each chamber from the chamber(s) which adjoin it.

Each such chamber may if desired be filled with water or other heat transfer fluid.

Downward spacing of the top of each cylindrical baffle 72 from the horizontal baffle 76 above it and upward spacing of the bottom of each baffle 72 from another horizontal baffle (not shown) similar to baffle 76 and located below the respective baffle 72 affords opportunity for circulation of the heat transfer fluid around baffle 72. Any suitable axial spacing means may be used to maintain the desired axial spacing between the baffles 72 and 76. Fluid passes upwardly between baffle 72 and container 70, as the fluid absorbs heat from the HLW through the walls of container 70. After passing beneath horizontal baffle 76 and over the top of cylindrical baffle 72 the fluid passes downwardly between the baffle 72 and pile 1, as shown by arrow 79, giving up heat to the pile which dissipates it to the soil through fins 78. This is followed by flow of the fluid under the bottom end (not shown) of baffle 72, where it again flows upwardly in the above described manner to commence another heat transfer cycle. The fins 78 are preferably provided about the entire periphery of the pile 1, but they have been omitted from the foreground of FIG. 7 to simplify the illustration.

The circulation described in the preceding paragraph takes place on an individual basis in each of the chambers surrounding each of the vertically arranged series of containers. This tends to improve the uniformity of the temperature gradients in the external subsoil at progressively higher elevations along the height of the pile, thereby inhibiting generation of hydrothermal currents in the subsoil.

The invention contemplates inserting the waste in a pile at the site where the waste is to be buried as well as away from the site. However, it appears that the most practical method would be to encapsulate the waste inside individual containers in the calcined or vitreous form, and then implant the containers in the pile while the pile is on or near the shore. The method used to fill the pile may depend on the structure of the containers, if any, the presence or absence of a matrix material, and the size of the pile. Also, this invention contemplates a method in which individual sections of a pile are filled and then assembled together into a pile, or a method in which the sections of a pile are assembled and the waste then installed within the resulting assembly.

The pile may be filled while it is in either a vertical or horizontal position. While the vertical position has some advantages, difficulties arise in filling extremely long piles which are vertically oriented. However these problems are minimized if the filling location is on shore and if the pile is filled from a tower or lowered into a hole in the ground so that the upper end is more accessible.

The pile may be loaded with waste when it is in an off shore position at or away from the burial site. The water depth may be shallow, i.e. equal to or less than the section length of a pile or it may be greater than the length of the pile itself. During loading the pile may be supported by a dock or pier near the shore line or farther off shore by a vessel or a floating platform.

The pile or the pile sections may be moved to the burial site either before or after filling. The buoyancy of the pile may permit it to float unaided, as for example, if the pile is empty or only partially filled, or if it contains sufficient void volume if full. If flotation assistance is needed it may be supplied by floats, such as for example by an unfilled pile or by a vessel or any other floating structure. It is contemplated that the pile may be carried to the burial site on a vessel within the hull or on barges. Further, the invention contemplates the use of overland transport if necessary.

Sections which have been individually filled may be assembled either prior to or after flotation and preferably either on shore or on the burial site, although the invention contemplates assembly of the filled sections off shore and away from the burial site.

It is preferred that the piles be transported to the burial site after filling and either prior to or after assembly of any individual pile sections, if such are used. It is preferred that neither the pile nor cntainers, if used, be filled or assembled in transit and that waste or containers filled therewith, if present with the pile or on a transport vessel, be sealed in the pile for safety in transmit.

A stable underwater environment, useful as a burial site, is one which has been and is expected to be sufficiently free from geodynamic activity to avoid disengagement and/or rupturing of the pile. Geothermal activity includes for example volcanic activity and earthquake activity along outer sections of tectonic plates and fault lines. The burial site should also have a soil surface which is below the water table, and may be and preferably is a substantial distance from continental land masses and islands. Thus, particularly preferred sites include the central portions of tectonic plates such as the Hatteras Abyssal Plan Area which is three miles deep and 280 nautical miles Southeast of Cape Hatteras, North Carolina.

This invention is applicable to soils which exhibit a wide variety of physical properties such as penetrability, elasticity, viscosity and stability such as sands, especially fine-grain uniform sands, clays, mud, and soft sandstone, and may include soils containing strata of different materials. However, the soils are preferably self-healing when disrupted and, where radioactive wastes are involved, are preferably capable of adsorbing radionuclides. The most preferred soils which are well-suited for burying wastes in accordance with this invention are ocean sediments in regions which have a history of geodynamic stability extending through periods of time estimated to have lengths measured in millions of years.

The soil layer must be sufficiently thick for the desired extent of burial of the piles, preferably a soil depth of at least about 100 feet plus the length of the pile and preferably at least about 200 feet. The most preferred soils are at least about 300, and at least about 400 or more feet thick. The surface of the soil in the buriel area is preferably substantially level and is preferably not tilted or sloped and is preferably substantially removed from hills, valleys and cliffs.

The burial site may be in any suitable body of water, preferably well below depths having any significant amounts of either marine animal life or marine plant life, preferably in the ocean, and preferably within extremely deep waters, for example at least about 5,000 feet deep, more preferably at least about 10,000 feet and still more preferably at least about 13,000 feet deep.

Preferably, the stable underwater environment is also one which is sufficiently free of motion in the overlying water to avoid any substantial tendency to uncover a buried pile and to avoid any environmental harmful transport of radiation or waste away from the burial site when the pile remains intact and even in the most unlikely circumstance that the pile is breached. More preferably, the overlying waters have essentially no currents, little or essentially no oxygen and a temperature of about 4° C. The preferred waters are substantially dead in that they contain little or no life.

The burial bed is spaced far enough away from other uses of the bed and overlying water, both present and anticipated, so as to avoid disturbances of the bed. There preferably are no shipping, fishing or military activities in the area above the bed and no present or contemplated oil or mineral exploration or production activities within or near the boundaries of the bed.

According to a particularly preferred embodiment, the top of the pile is sealed, is below the surface of the bed and is preferably at least about 100 feet below the bed surface, or even about 130 or about 160 feet. More preferably, the top of the pile is at least about 200 feet or even 300 feet below the bed surface or mudline. The top of the pile may be driven to a lesser depth or even left exposed if desired for monitoring or if there is a potential need to recover the wastes stored within the pile. The depth of penetration of the pile into the sea floor may be monitored by local sonar attached to the top of the hammer, the data being transmitted up the instrument and power cable. After burial, the pile may be precisely located by a combination of radio and satellite navigation on the surface, coupled with sonar, inertial navigation, transponders, and Sub-loran techniques near the bottom, and may be exposed later, if needed, by water-jetting. In addition to the forms of driver-to-pile driving connections shown in FIG. 1 above and in the prior Wisotsky patents incorporated by reference, FIG. 8 discloses that an extra thick bell-mouth formed at or secured to the top of the pile 1 may be gripped by a surrounding or encircling clamp member 80. Pile 1 of FIG. 8 includes an inner container or pile 92 with an upper collar 93 which in this case are both spaced inwardly from the surrounding portions of pile 1. Upper pile seal 81 may be a plug member having a conical mushroom-shaped head 91, threadedly secured in the plug member with the aid of lock nut 82, and may be grasped by latch-type connector 83 for lifting and lowering the complete assembly of seal 81, pile 1 and inner pile 92 prior to driving. This plug member 81 is mounted in close-fitting, fixed, sealing relationship with upper collar 93 fixed on pile 92 and with the bell portion of pile 1 by bolts 84, and is not normally removed from the pile 1 after it is driven. Clamp 80 may be provided with one or more vertical splits (not shown) and a remote actuator (not shown) for expanding and opening the bell-surrounding portions of the clamp by lateral motion of the sections on either side of the splits to release the driver from the pile. Despite the wide clearance shown between clamp 80 and the bell portion of pile 1 in FIG. 8, it will be appreciated that these parts will be in close-fitting engagement in actual practice.

Figure 8:
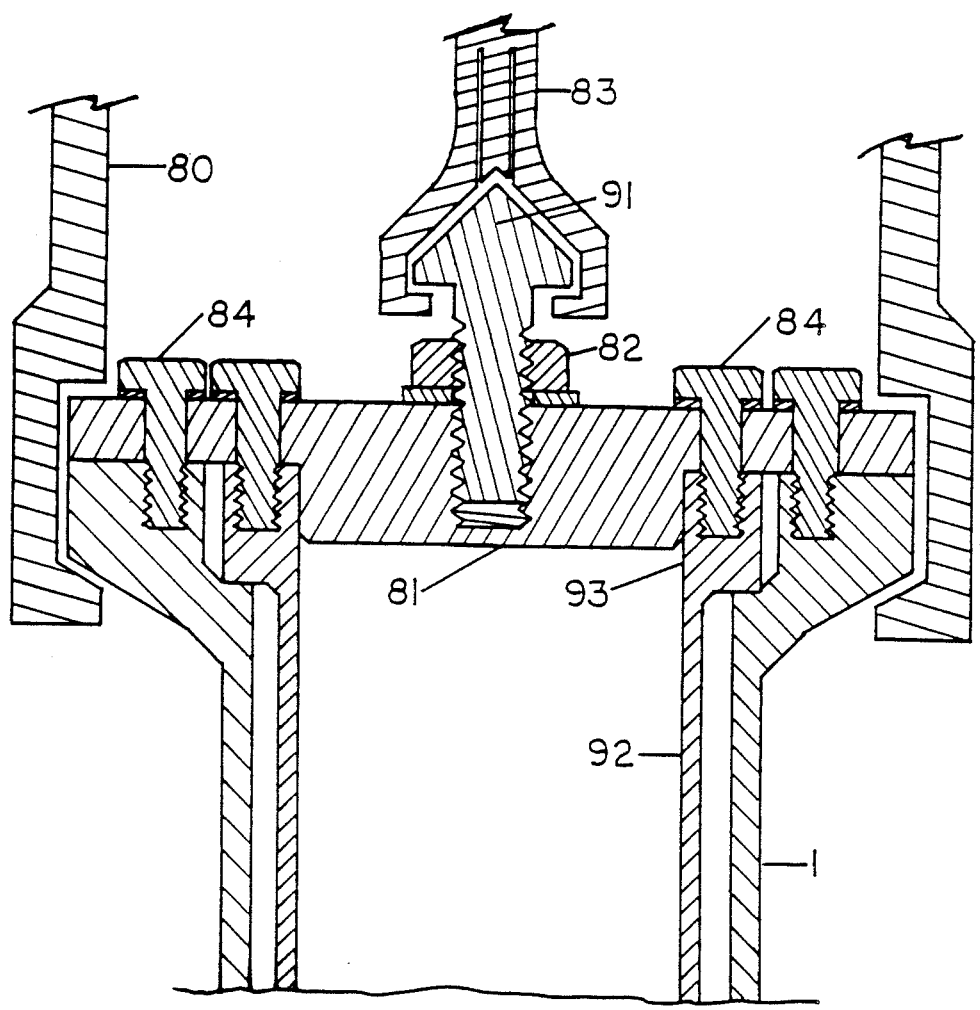
FIG. 8 shows a stucture for driving a coaxial pile pair downwardly for burial.
Figure 9:
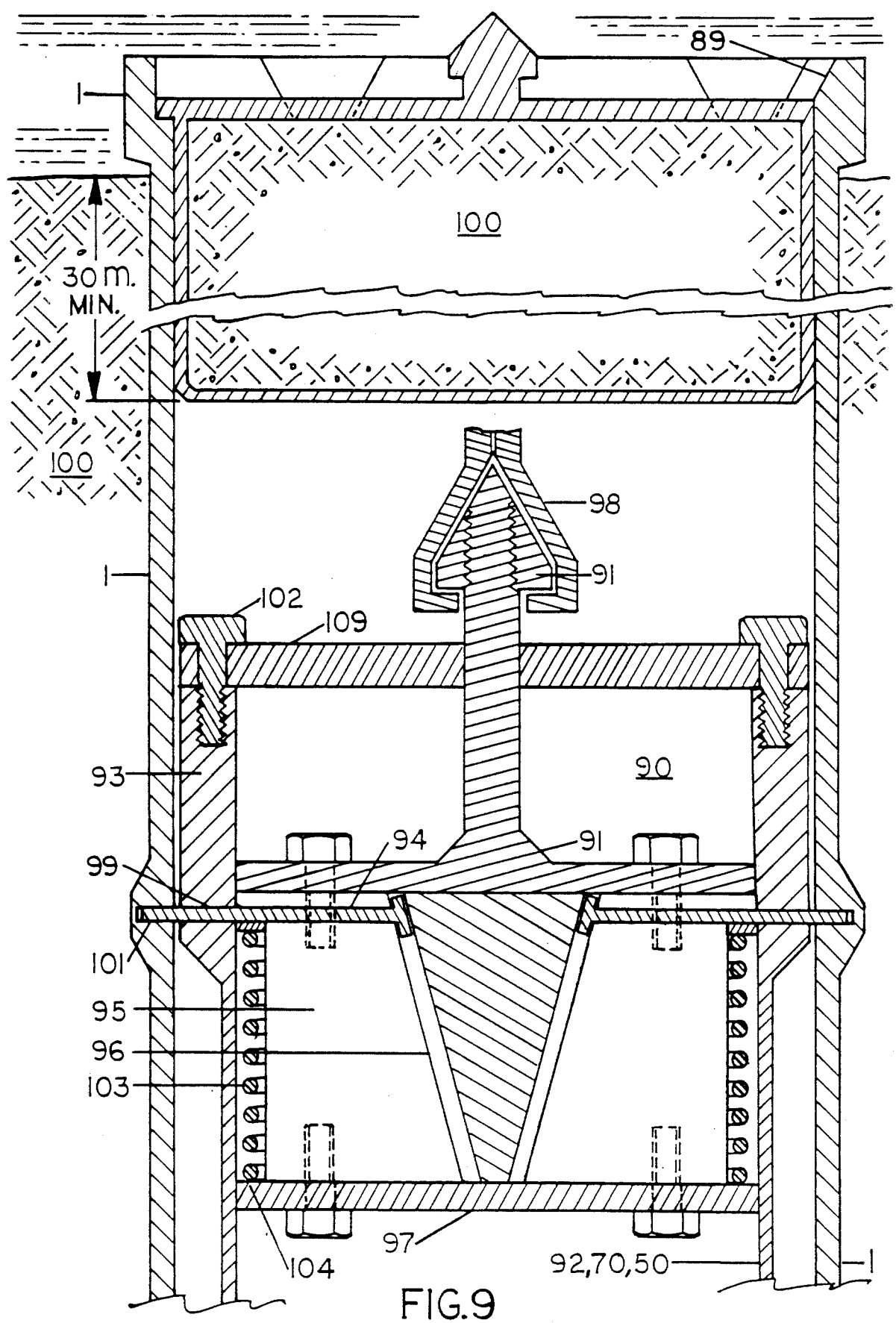
FIG. 9 shows a structure for removing upwardly the inner pile of a coaxial pile pair from the seabed after burial.

FIG. 9 shows a pile 1 and a removable upper pile seal 90 on removeable inner pile 92 which can be removed from pile 1 after it has been driven for monitoring or recovery of the wastes after any selected time interval, such as a few decades. Inner pile 92 may be in readily reciprocable sliding engagement with the inner surface of pile 1 as shown in FIG. 9 or spaced inwardly therefrom as shown in FIGS. 7 and 8. In the present embodiment, upper file seal 90 may be a plug member having a conical mushroom-shaped head 91 for grasping and pulling. This plug member, an upper collar 93 fixed on pile 92 and a bell portion of pile 1 are mounted in close-fitting, reciprocable engagement with one another, being normally held in fixed, sealing relationship with a latching arrangement which may for example be part of seal 90. A chamfer 89 formed on the inside of the bell portion of pile 1 facilitates insertion of pile 92 and collar 93. This assembly may be driven with the clamp 80 shown in FIG. 8 or any other suitable clamping arrangement.

Figure 10:
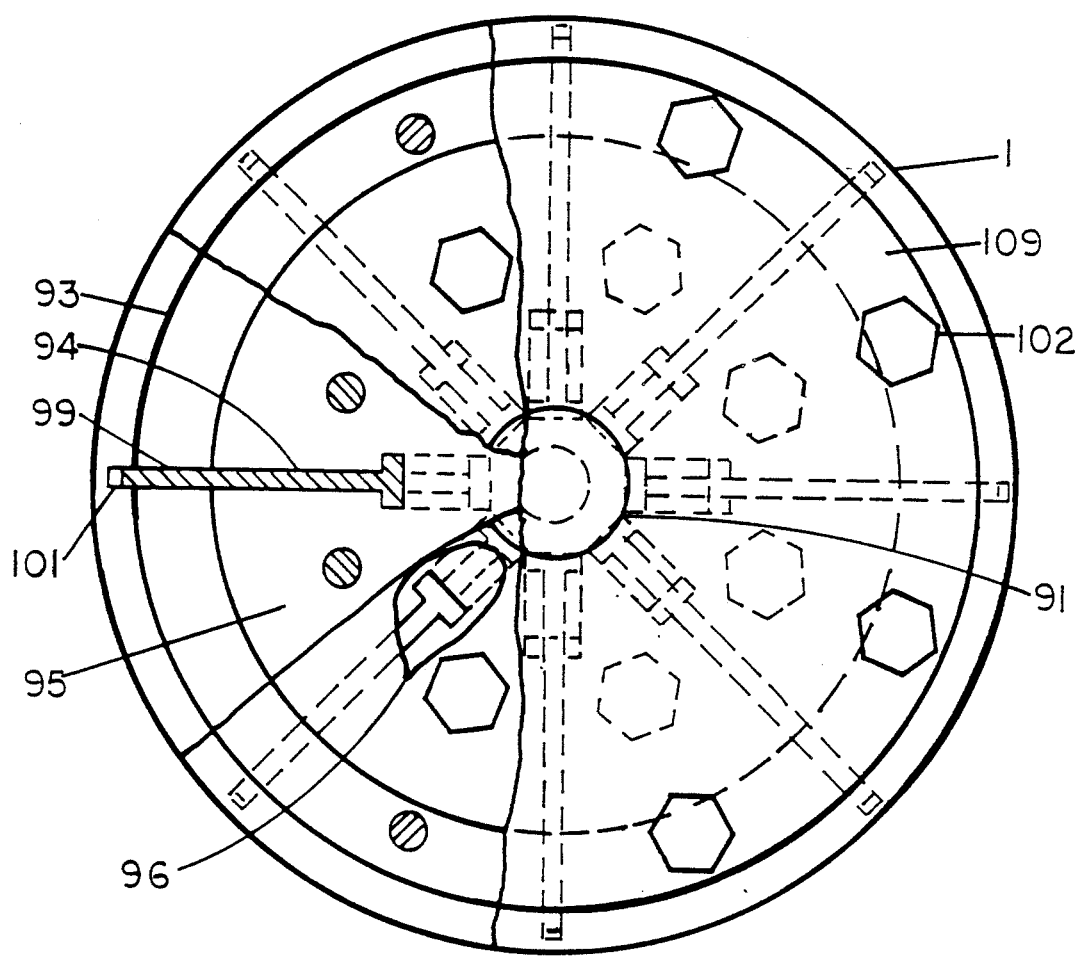
FIG. 10 is a sectional view of the structure of FIG. 9, taken on section line 10—10 of FIG. 9.

According to the present embodiment, as shown by comparison of FIGS. 9 and 10, seal 90 has an upper section 95 that includes a circular array of T-cross-section slots 96 which extend from its upper end to the upper face of a lower section 97, and which are inclined inwardly as they extend downwardly. Within slots 96 are the heads of radially reciprocable latching pins 94 whose shank portions are adapted to extend through the bases of the T's of the T-cross-section slots 96 and out of the cylindrical side wall of upper section 95 into corresponding holes 99 and 101 in collar 93 and pile 1 respectively. Down force on pile seal 90, supplied by spring 103 compressed between pins 94 and flange 104 formed about the bottom of lower section 97, maintains the radial pins 94 in their respective locking positions in holes 99 and 101. Up force on pile seal 90 supplied by grasping and pulling tool 98 retracts the pins 94. However, the upward limit of movement of upper section 95 and the spatial relationships of the slots 96 are such as to cause pins 94 to withdraw only from holes 101 in pile 1 while remaining in holes 99 in collar 93. Continued upward pressure on tool 98 pulls collar 93 and pile 92 free from pile 1, which remains buried.

The cover 109 and cover screws 102 prevent the pile seal 90 from pulling out of pile 92 during lifting. After the assembly reaches the surface and is secured on the recovery vessel or in another secure location, the cover screws 102 and cover 109 may be removed and the latching pins 94 may be fully extended for removing the seal 90 from the inner pile 92.

The invention is capable of embodiment in many other forms, and it should therefore be understood that the foregoing preferred embodiments are for the purpose of illustrating but not limiting the invention.

I claim:

1. A geophysical repository method to more safely dispose of hazardous wastes in a hollow pile depository buried in a geologically stable subseabed under deep waters of minimum motion and life; immobilizing said hazardous materials within containers inside said pile; said pile interred into deka-millions years old sediments employing offshore piledriving techniques including repetitively applying impulsive, vibratory, and/or sustained driving forces from an extrinsic power source; buying said wastes inside said pile at a minimum depth of one hundred feet within the subseabed; precisely determined the location of said buried pile, for entry or future recovery of said containers, by surface and submarine navigation/positioning techniques.

2. A method according to claim 1 comprising immobilizing hazardous waste, at a filling location, within an elongated pile or a section of pile, and transporting the filled pile or section thereof in or on a body of water away from the filling location and toward the underwater burial site.

3. A method according to claim 1 wherein the ratio of pile length to the burial distance of the pile tip is at least 0.3.

4. A method according to claim 1 wherein the ratio of pile length to the burial distance of the pile tip is at least 0.5.

5. A method according to claim 1 or 2 wherein the length of the pile or pile section is at least about forty feet.

6. A method according to claim 1 or 2 wherein the length of the pile or pile section is at least about one hundred feet.

7. A method according to claim 1 or 2 wherein the waste comprises or is composed of solid, liquid, and/or gaseous high level radioactive waste material including transuranic waste, mill tailings, or any other material containing at least one of the following amounts of emitters per metric ton, expressed in Curies ($3.7 \times 10^{10}$ disintegrations per second): alpha emitters—at least 1; beta and/or gamma emitters—at least 100; tritium—at least $10^6$.

8. A method according to claim 1 or 2 wherein the hazardous waste material comprises or is composed of solid, liquid, and/or gaseous low level radioactive waste.

9. A method according to claim 1 or 2 wherein the hazardous waste comprises or is composed of solid, liquid, and/or gaseous non-radioactive material.

10. A method according to claim 1 or 2 wherein the waste is held within one or more containers enclosed in the pile or pile section thereof.

11. A method according to claim 1 or 2 wherein the waste is held within an elongated coaxial tube within the pile or pile section thereof.

12. A method according to claim 1 or 2 wherein the waste comprises or is composed of solid, liquid, and/or gaseous high level radioactive waste material held within an elongated coaxial tube within the pile or section thereof and including transuranic waste, mill tailings, or any other material containing at least one of the following amounts of emitters per metric ton, expressed in Curies ($3.7 \times 10^{10}$ disintegrations per second): alpha emitters—at least 1; beta and/or gamma emitters—at least 100; tritium—at least $10^6$.

13. A method according to claim 1 or 2 where in the pile or section thereof is a plurality of containers in vertically-stacked tiers holding low level radioactive wastes.

14. A method according to claim 1 or 2 where in the pile or section thereof is a plurality of containers in vertically-stacked tiers holding gaseous, liquid, and/or solid wastes of non-radioactive materials.

15. A method according to claim 1 or 2 where in the pile or section thereof the waste is held within a plurality of containers fixed together in vertically-stacked tiers.

16. A method according to claim 15 wherein the pile cross-sectional area is at least about seven times the cross-sectional area of one container.

17. A method according to claim 15 wherein the pile cross-sectional area is at least about nineteen times the cross-sectional area of one container.

18. A method according to claim 15 wherein the pile and the container(s) are of circular cross-section and the pile section diameter is at least about three container diameters.

19. A method according to claim 15 wherein the pile and the container(s) are of circular cross-section and the pile section diameter is at least about five container diameters.

20. A method according to claim 1 wherein the elevation of the soil surface at the burial site is beneath waters at least about one mile deep.

21. A method according to claim 1 wherein the elevation of the soil surface at the burial site is beneath waters at least about two miles deep.

22. A method according to claim 1 wherein the burial site is beneath waters at least 5000 feet deep, in self-healing, radioactive nuclide adsorptive soils having a thickness sufficient for the desired depth of pile burial and at least about 140 feet thick and wherein the overlying waters are substantially free of currents and life forms.

23. A method according to claim 1 wherein the top of the pile is driven at least 100 feet below the surface of the soil.

24. A method according to claim 1 wherein the top of the pile is driven to an elevation intermediate the water and subsoil surfaces and wherein the portion of the pile containing the hazardous material is below the surface of the subsoil by a distance of at least one hundred feet.

25. A method according to claim 24 wherein the length of a removable nuclide-adsorptive, concrete-filled cap/plug placed inside the upper end of the pile, which top is exposed above the seabed, is made such that its bottom is at least 100 feet beneath the subseabed surface to ensure the 100 foot secure minimum burial of the hazardous material.

26. A method according to claim 11 whereby the pile is interred empty and the assemblies of hazardous waste container(s) are inserted therein afterwards.

27. A method according to claim 2 wherein waste is implanted within the pile or section thereof at an off-site location.

28. A method according to claim 2 wherein waste is implanted in the pile or section thereof at an on-shore, off-site location.

29. A method according to claim 27 or 28 wherein pile sections are filled individually and assembled prior to driving.

30. A method according to claim 27 or 28 wherein pile sections are filled individually on-shore and assembled prior to driving.

31. A method according to claim 27 or 28 wherein the pile sections are filled individually and assembled on-shore prior to transport.

32. A method according to claim 27 or 28 wherein the pile or section thereof is suspended in water during filling or transport to the driving site.

33. A method according to claim 32 wherein the pile or section thereof is floating during filling.

34. A method according to claim 32 wherein the pile or section thereof is floated for transport to the driving site.

35. A method according to claim 32 wherein the pile or section thereof is floated at least in part on its own buoyancy.

36. A method according to claim 32 wherein the pile or section thereof is floated at least in part with the assistance of float, vessel, or other on- or of-shore, land- or water-borne structure, or combination thereof.

37. A method according to claim 32 wherein the pile or section thereof is floated in or on a vessel for transport to the driving site.

38. Apparatus to safely dispose of hazardous wastes in a stable, suboceanic geologic repository consisting of an interred, elongated, hollow pile or section of a pile holding one or more containers of said hazardous materials immobilized therein, said pile or section thereof suitable for burial into the subseabed by employing offshore piledriving techniques including sustained applications of driving forces from an extrinsic power source so that said wastes are effectively interred at a minimum depth of 100 feet but, if required, may be recovered within decades from said repository precisely located by oceanographic acoustic/navigation techniques.

39. Apparatus according to claim 38 wherein the waste comprises or is composed of solid, liquid, and/or gaseous high level radioactive waste material including transuranic waste, mill tailings, or any other material containing at least one of the following amounts of emitters per metric ton: alpha emitters—at least 1; beat and/or gamma emitters—at least 100; tritium—at least $10^{10}$.

40. Apparatus according to claim 38 or 39 wherein the inner walls of said pile are covered with a layer of material for shielding against radioactivity.

41. Apparatus according to claim 38 wherein the waste comprises or is composed of solid, liquid, and/or gaseous low level radioactive waste material.

42. Apparatus according to claim 38 wherein the hazardous waste comprises or is composed of solid, liquid, and/or gaseous material that is non-radioactive.

43. Apparatus according to claim 38 wherein the hazardous waste is held within one or more containers enclosed in the pile or section therof.

44. Apparatus according to claim 38 wherein the waste is held within an elongated coaxial tube within the pile or section thereof.

45. Apparatus according to claim 38 wherein the waste comprises or is composed of solid, liquid, and/or gaseous high level radioactive waste material held within an elongated coxial tube within the pile or section thereof and including transuranic waste, mill tailings, or any other material containing at least one of the following amounts of emitters, expressed in Curies ($3.7 \times 10^{10}$ disintegrations per second) per metric ton: alpha emitters—at least 1; beta or gamma emitters—at least 100; tritium—at least $10^6$.

46. Apparatus according to claim 38 wherein the waste comprises or is composed of solid, liquid, and/or gaseous low level radioactive waste material held within a plurality of containers positioned in vertically-stacked tiers within the pile or section thereof.

47. Apparatus according to claim 38 wherein the waste comprises or is composed of solid, liquid, and/or gaseous non-radioactive material held within a plurality of containers positioned in vertically stacked tiers within the pile or section thereof.

48. Apparatus according to claim 38 wherein the waste is held within a plurality of containers fixed together in vertically stacked tiers within the pile or section thereof.

49. Apparatus according to claim 48 wherein the pile or section thereof has a cross-sectional area at least about seven times the cross-sectional area of one container.

50. Apparatus according to claim 48 wherein the pile or section thereof has a cross-sectional area at least about nineteen times the cross-sectional area of one container.

51. Apparatus according to claim 48 wherein the pile or section thereof and the container(s) are of circular cross-section and the pile or section diameter is at least about three container diameters.

52. Apparatus according to claim 48 wherein the pile or section and the container(s) are of circular cross-section and the pile or section diameter is at least about five container diameters.

* * * * *